United States Patent
Santry

(10) Patent No.: US 9,213,501 B2
(45) Date of Patent: Dec. 15, 2015

(54) EFFICIENT STORAGE OF SMALL RANDOM CHANGES TO DATA ON DISK

(71) Applicant: NetApp, Inc., Sunnyvale, CA (US)

(72) Inventor: Douglas Joseph Santry, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 298 days.

(21) Appl. No.: 13/901,236

(22) Filed: May 23, 2013

(65) Prior Publication Data

US 2014/0351506 A1    Nov. 27, 2014

(51) Int. Cl.
*G06F 12/00* (2006.01)
*G06F 3/06* (2006.01)

(52) U.S. Cl.
CPC .............. *G06F 3/0689* (2013.01); *G06F 3/061* (2013.01); *G06F 3/064* (2013.01); *G06F 3/067* (2013.01); *G06F 3/0619* (2013.01); *G06F 3/0656* (2013.01)

(58) Field of Classification Search
CPC ....... G06F 3/061; G06F 3/0656; G06F 3/064; G06F 3/0641; G06F 3/0644
See application file for complete search history.

(56) References Cited

U.S. PATENT DOCUMENTS 8,417,871 B1*   4/2013   de la Iglesia ....................... 711/5
2010/0174881 A1*   7/2010   Anglin et al. .................. 711/162
2012/0072652 A1*   3/2012   Celis et al. .................... 711/103

FOREIGN PATENT DOCUMENTS

WO    WO-2012161659 A1    11/2012

OTHER PUBLICATIONS

M. Fredman, Fibonacci Heaps and Their Uses in Improved Network Optimization Algorithms, Journal of the Association for Computing Machinery, vol. 34, No. 3, pp. 596-615, Jul. 1987.
PCT Notification of Transmittal of the International Search Report and the Written Opinion of the International Searching Authority, or the Declaration, International Searching Authority, International Application No. PCT/US2014/039120, mailed Aug. 4, 2014, 8 pages.

* cited by examiner

*Primary Examiner* — Aimee Li
*Assistant Examiner* — Michael C Kolb
(74) *Attorney, Agent, or Firm* — Cesari and McKenna, LLP

(57) ABSTRACT

The embodiments described herein provide a system and method for efficiently storing small, random modifications or changes to data on one or more storage devices, such as disks, of storage servers coupled to a host computer in a network environment. Illustratively, the data is stored in a region of a byte-addressable, persistent memory of the host computer and is replicated (i.e., copied) as changed data of the region on the disks at the granularity at which it was modified, e.g., at the byte-addressable granularity. To that end, each storage server employs a data structure (e.g., a Fibonacci array) that is configured to efficiently accumulate the small, random data changes into one or more large blocks of changed data for storage on the disks in a manner that realizes the streaming bandwidth of the disk.

20 Claims, 7 Drawing Sheets

EFFICIENT STORAGE OF SMALL RANDOM CHANGES TO DATA ON DISK

BACKGROUND

1. Technical Field

The present disclosure relates to storage of data and, more specifically, to efficient storage of small random changes to data on one or more disks coupled to a host computer in a network environment.

2. Background Information

Many modern computing algorithms are page-based and implemented in a kernel of an operating system executing on a host computer. Paging is a memory management function that facilitates storage and retrieval of data in blocks or "pages" to and from primary storage, such as disk. For example, assume that an application executing on the host computer utilizes a page-based algorithm to, e.g., insert a new node into a doubly-linked list. Execution of the algorithm may result in a first modified ("dirtied") page, i.e., the page with a previous pointer, a second dirtied page, i.e., the page with a next pointer, and a third dirtied page containing the newly inserted node. Modification of the pages requires a number of (e.g., three) random seek operations to retrieve the pages from the disk, as well as the same number of additional seek operations to write the modified pages back to the disk. It is thus desirable to utilize data structures on disk-based systems that avoid such random and expensive operations.

The advent of byte-addressable persistent memory, such as storage class memory, may accelerate adoption of primary storage to reside on a memory bus of the host computer, as well as acceptance of "in-memory" computing. Applications written for persistent (non-volatile) byte-addressable storage incur no penalty for random access and thus behave differently, e.g., they persist as directly byte-addressable linked-lists as described above. The persistent memory may be configured to enable applications executing on the host computer to safely and consistently modify (change) their data at a byte addressable granularity to, e.g., survive failures. That is, the applications may perform high-frequency, small random accesses to change the data in the persistent memory. Yet, even safe and consistent data stored in the persistent memory may be vulnerable in the event of a disaster because there is only a single copy of the data on the host computer.

Therefore, there is an economically advantageous need to replicate the changed data on one or more storage devices, such as disks, of remote machines connected to the host computer over a network to thereby allow recovery from a disaster. However, disks generally provide good streaming bandwidth performance (e.g., reading and writing of a large number of sequential blocks or "track reads") but do not perform well on small random accesses (i.e., reading and writing a single disk sector preceded by a disk seek). In other words, disks operate most efficiently in sequential or streaming bandwidth mode, whereas small random accesses (such as the random seek operations described above) can substantially slow the performance of disks. Accordingly, there is a need to match the random access, byte-addressable capability of persistent memory on the host computer with the block-based, streaming bandwidth capability of disks.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
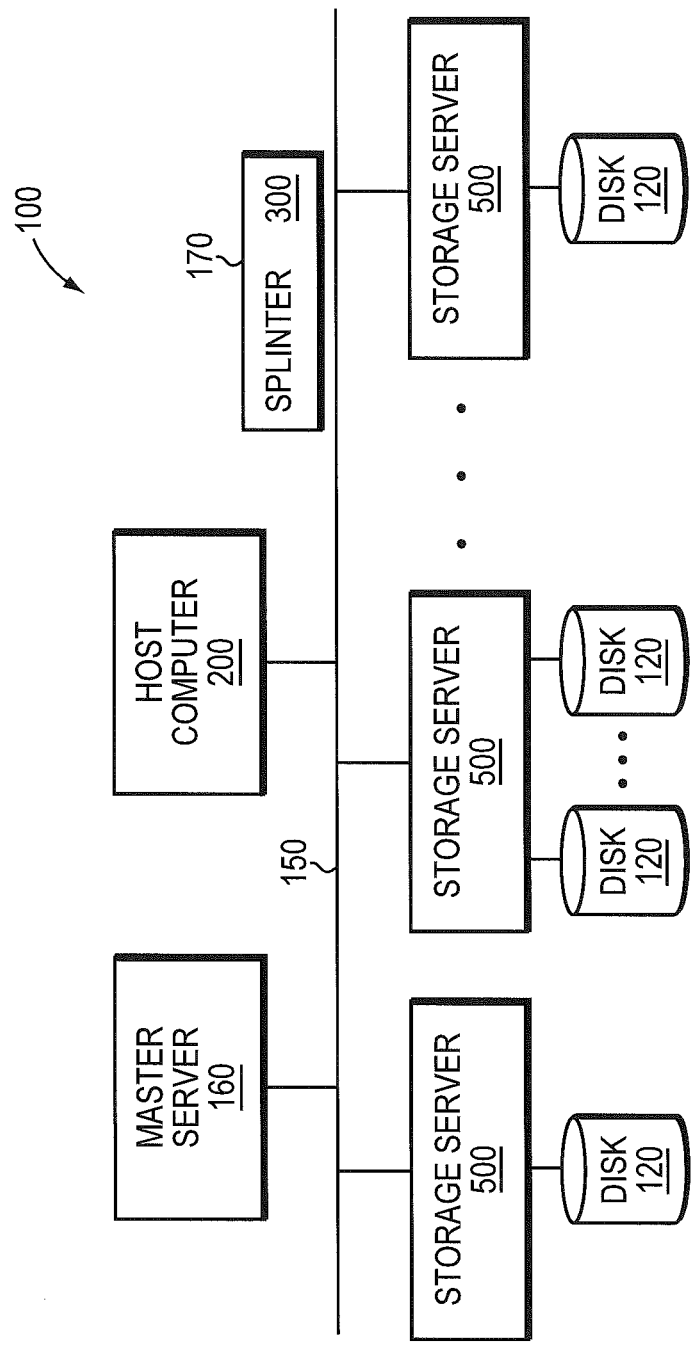
FIG. 1 is a block diagram of a network environment.

The embodiments described herein provide a system and method for efficiently storing small, random modifications or changes to data on one or more storage devices, such as disks, of storage servers coupled to a host computer in a network environment. Illustratively, the data is stored in a region of a byte-addressable, persistent memory of the host computer and is replicated (i.e., copied) as changed data of the region on the disks at the granularity at which it was modified, e.g., at the byte-addressable granularity. To that end, each storage server employs a data structure that is configured to efficiently accumulate the small, random data changes into one or more large blocks of changed data for storage on the disks in a manner that realizes the streaming bandwidth of the disk.

In one or more embodiments, the data structure is illustratively an on-disk array (e.g., a Fibonacci array) that is stored on the storage server and maintained by a user-level process or agent executing on the server. Illustratively, the array is organized as a series of levels; the array is parameterized by block size B, such that a size of a level is determined by a number of block entries within the level. Notably, the number of entries for each level is a sum of the numbers of entries of the previous two levels, e.g., a first level (and a second level) is of length B, followed by subsequent levels of lengths 2B, 3B, 5B, 8B and so on; a Fibonacci series. A logical representation of the on-disk array is maintained in the persistent memory as an in-core storage array. A portion of the in-core storage array is organized as a pool of buffers, with each buffer also having a size B. The buffers are illustratively maintained by the user-level agent as a staging area for accumulating the small, random data changes prior to storage on the disk as large block entries of the array. The user-level agent also maintains a plurality of disk pointers, wherein each disk pointer references (points to) a level of the array that corresponds to a location of the beginning of a level on disk.

In an embodiment, each level of the array is ordered internally, e.g., by a base memory address of the changed data, with inter-level ordering being temporal. In other words, a higher level of the array connotes older block entries, e.g., the first, lowest level contains an internal ordering of newest block entries, while the last, highest level contains an internal ordering of the oldest entries. To maintain internal ordering within the levels, the user-level agent illustratively implements a merge-sort technique that operates to sort (i.e., order) and periodically merge the contents of an accumulated (full) buffer with the entries of ascending levels of the array to thereby discard duplicate entries (e.g., to bound the size of the array), while also coalescing neighboring entries (e.g., to reduce the size of the array). Moreover, the periodic merging of ascending levels having larger sums of entries improves the on-disk layout of the array by enabling allocation of substantially long runs of contiguous disk blocks and realization of the streaming bandwidth capability of the disks, e.g., for both replication and restore of the region.

DESCRIPTION

FIG. 1 is a block diagram of a network environment 100 that may be advantageously used with one or more embodiments described herein. The environment 100 may include a host computer 200 coupled to a plurality (e.g., a cluster) of storage servers 500 over a computer network 150. The computer network 150 may include one or more point-to-point links, wireless links, a shared local area network, a wide area network or a virtual private network implemented over a public network, such as the well-known Internet, although in an embodiment, the computer network 150 is illustratively an Ethernet network. The environment 100 may also include a master server 160 configured to manage the cluster of storage servers 500. The master server 160 may be located anywhere on the network 150, such as on host computer 200 or on a storage server 500; however, in an embodiment, the master server 160 is illustratively located on a separate administrative computer.

As described further herein, each storage server 500 may be embodied as a computer, such as a storage system, a storage appliance embodied as a filer, or a blade running a user level process, configured to provide storage services to the host computer 200. As such, each storage server 500 includes computing and memory elements coupled to one or more storage devices, such as disks 120. The host computer 200 may communicate with the storage servers 500 using discrete messages or splinters 300 contained within frames 170, such as Ethernet frames, that are transmitted over the network 150 using a variety of communication protocols including, inter alia, wireless protocols and/or Ethernet protocols. However, in an embodiment described herein, the frame 170 is illustratively encapsulated within a User Datagram Protocol/Internet Protocol (UDP/IP) messaging protocol.

Figure 2:
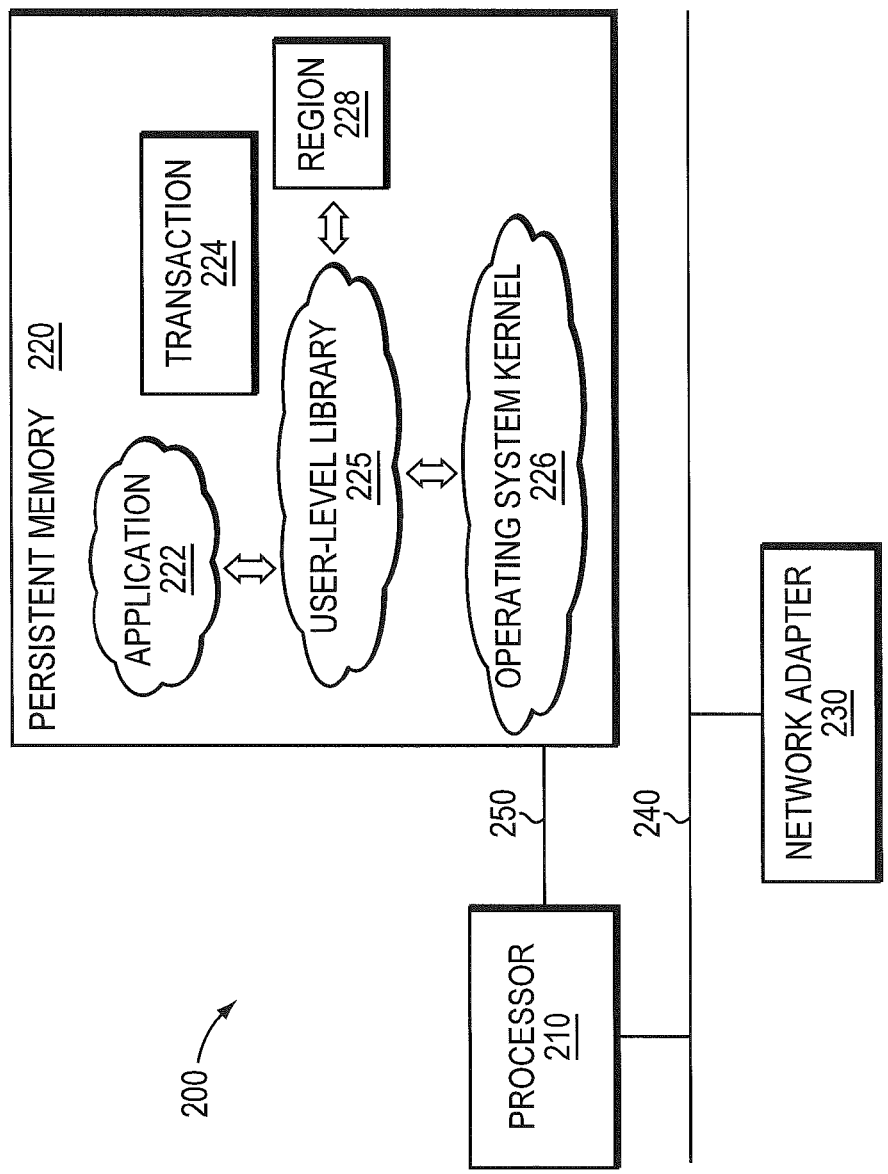
FIG. 2 is a block diagram of a host computer of the network environment.

FIG. 2 is a block diagram of host computer 200 that may be advantageously used with one or more embodiments described herein. The host computer 200 illustratively includes a processor 210 connected to a persistent memory 220 over a memory bus 250 and connected to a network adapter 230 over a system bus 240. The network adapter 230 may include the mechanical, electrical and signaling circuitry needed to connect the host computer 200 to the storage servers 500 over computer network 150. The network adapter 230 may also include logic circuitry configured to transmit frames 170 containing the splinters 300 over the network 150 in accordance with one or more operational modes that replicate information contained in the splinters on the disks 120 of the storage servers 500.

The persistent memory 220 may illustratively be embodied as non-volatile memory, such as storage class memory, having characteristics that include, e.g., byte addressability of data organized as logical constructs, such a file or region 228, in the memory. The byte addressable, persistent memory 220 may include memory locations that are addressable by the processor 210 for storing software programs and data structures associated with the embodiments described herein. The processor 210 may, in turn, include processing elements and/or logic circuitry configured to execute the software programs, such as user-level library 225, and manipulate the data structures, such as transaction 224. An operating system kernel 226, portions of which are typically resident in persistent memory 220 and executed by the processing elements, functionally organizes the host computer by, inter alia, invoking operations in support of one or more applications 222 executing on the computer. Illustratively, the application 222 may be implemented via a process that includes a plurality of threads. It will be apparent to those skilled in the art that other processing and memory means, including various computer readable media, may be used to store and execute program instructions pertaining to the embodiments herein.

As used herein, the region 228 may be a logically contiguous address space that is backed physically with the persistent memory 220. The region 228 may be mapped into an address space of the application (i.e., process) to enable modification, e.g., writing, of the region 228 by the application. Once the region is mapped into the application's address space, the user-level library 225 may control access to the region. That is, the application 222 may read and/or write data stored in the region of the locally attached persistent memory through the library 225. As a result, the user-level library 225 may operate as a control point for accessing the persistent memory 220, thereby circumventing the operating system kernel 226.

In one or more embodiments, the user-level library 225 may configure the persistent memory 220 as a software transactional memory (STM) system defined by operations, such as a STM commit operation, that ensure safe and consistent storage of data in the region 228 of the persistent memory 220, as well as on one or more disks 120 of the storage servers 500. To that end, the user-level library 225 contains computer executable instructions executed by the processor 210 to perform operations that select a storage server on which to replicate the data. In addition, the library 225 contains computer executable instructions executed by the processor 210 to perform operations that modify the persistent memory 220 to provide, e.g., atomicity, consistency, isolation and durability (ACID) semantics or properties. The ACID properties of the STM system are illustratively implemented in the context of transactions, such as transaction 224, which atomically move data structures (and their associated data) stored in the memory from one correct ACID state to another. In an embodiment, the data structures associated with a transaction 224 maintain a serial number (e.g., a monotonically increasing value) embodied as an identifier of the transaction. The STM system thus enables the application 222 to modify its data of a region 228 in a manner such that the data (e.g., data structure) moves atomically from one safe consistent state to another consistent state in the persistent memory 220.

Illustratively, the library 225 may cooperate with application 222 to control access to the data stored in the region of the persistent memory 220 as transaction 224 using the STM commit operation. In an embodiment, the application (i.e., thread) may initiate the transaction 224 by assembling all elements (data) that it intends to write for that transaction; this is referred to as a read/write (r/w) set of the transaction. For example, assume that the transaction 224 involves inserting a new node into a doubly-linked list within region 228. In accordance with the byte addressability property of the persistent memory 200, the application may render small, random modifications or changes to the data; to that end, the elements of the r/w set that the application intends to write (change) may include a previous pointer, a next pointer, and a new node, thereby resulting in a small amount of bytes of changed data. The application 222 may then cooperate with the user-level library 225 to execute the transaction in accordance with the STM commit operation. Successful execution of the commit operation (and the transaction) results in changing every element (datum) of the write set simultaneously and atomically, thus ensuring that the contents of the persistent memory are safe and consistent. Within the context of the transaction 224, the library 225 may precisely determine which bytes of the data have changed within the region 228, as well as how and when the data bytes have changed. Armed with precise knowledge of the context of the transaction, the library 225 may efficiently replicate (i.e., copy) the changed data at the granularity at which it was modified, e.g., at the byte-addressable granularity.

Figure 3:
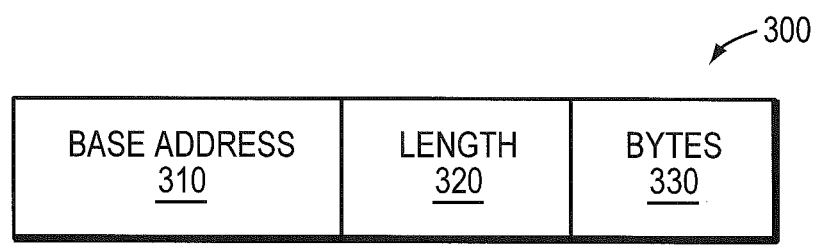
FIG. 3 is a block diagram of a splinter.

In one or more embodiments, the library 225 may initiate replication of the data by forwarding the changed data to network adapter 230 of host computer 200 as one or more splinters 300 associated with the transaction 224. FIG. 3 is a block diagram of a splinter 300 that may be advantageously used with one or more embodiments described herein. Illustratively, splinter 300 may contain information such as a starting or base memory address 310 of the changed data within the region, a length 320 of the changed data and a string of bytes 330 of the changed data. Notably, the splinters 300 are created at the granularity of the actual individual bytes of data that are written. For example, referring to the node insertion transaction described above, three (3) splinters containing the changed data are illustratively created by the library and forwarded to the adapter in the context of transaction 224: a first splinter containing the base memory address, length and bytes of the next pointer; a second splinter containing the base memory address, length and bytes of the previous pointer, and a third splinter containing the base memory address, length and bytes of the newly inserted node. Replicating changed data at the byte-addressable granularity represents a substantial cost savings because time and computing resources, such as network bandwidth and network buffer space, are not wasted on replicating (copying) data that has not changed.

Figure 4:
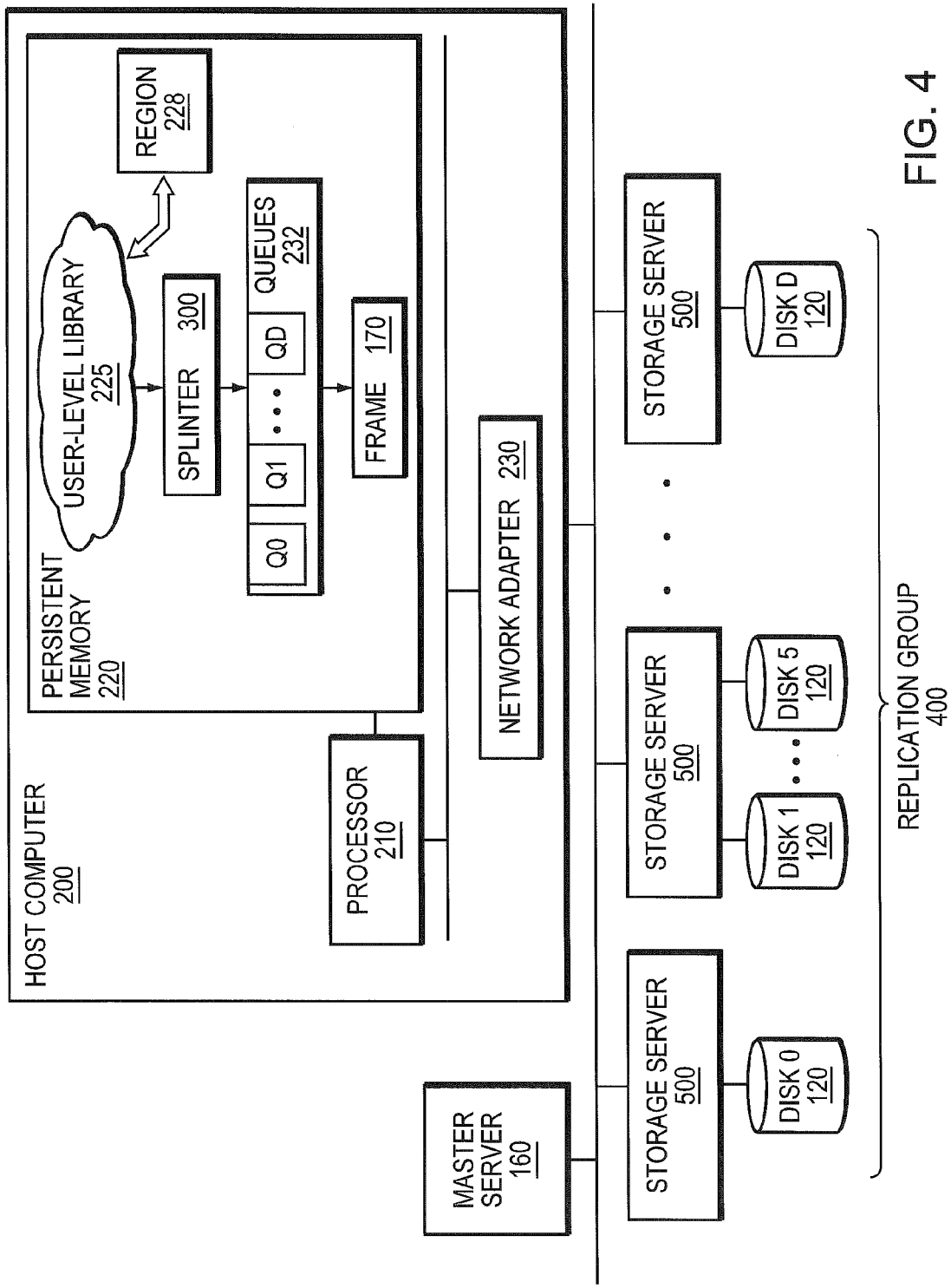
FIG. 4 is a block diagram of a replication group.

The network adapter 230 may thereafter forward each splinter 300 over computer network 150 to one of the plurality (cluster) of remote storage servers 500 having disks 120 organized as a replication group for the region. FIG. 4 is a block diagram of a replication group 400 that may be advantageously used with one or more embodiments described herein. The replication group 400 is associated with region 228 and may be organized by, e.g., assignment of a predetermined number of disks 120 attached to a number of remote storage servers 500. The assignment of disks to the replication group is illustratively performed by the master server 160. The persistent memory 220 may include a plurality of queues 232 configured to store the splinter 300 prior to forwarding of the splinter 300 to the network adapter 230 as, e.g., frame 170. The library 225 may organize the queues 232 according to the disks 120 of the replication group 400.

In an embodiment, the splinter 300 may be created by the library 225 in the context of the STM commit operation and forwarded over the network 150 by the network adapter 230 in accordance with a synchronous or asynchronous mode of replication. Here, the splinter is loaded (possibly individually) into a frame 170, processed by a network protocol stack of the operating system kernel 226 and promptly transmitted by the network adapter 230 over the network 150 to a storage server 500 serving a selected disk 120 of the region's replication group 400. Illustratively, the transmission maintains temporal information of the splinter (e.g., embodied as a transaction identifier associated with the splinter). An example of technique for selecting a disk of a region's replication group that may be advantageously used with the embodiments herein is described in co-pending and commonly assigned U.S. patent application Ser. No. 13/901,201 filed even with the present application and titled Efficient Replication of Changes to a Byte-Addressable Persistent Memory Over a Network, also published as U.S. Patent Application Publication 2014/0351536 on Nov. 27, 2014, by Douglas Santry, which application is hereby incorporated by reference herein.

Figure 5:
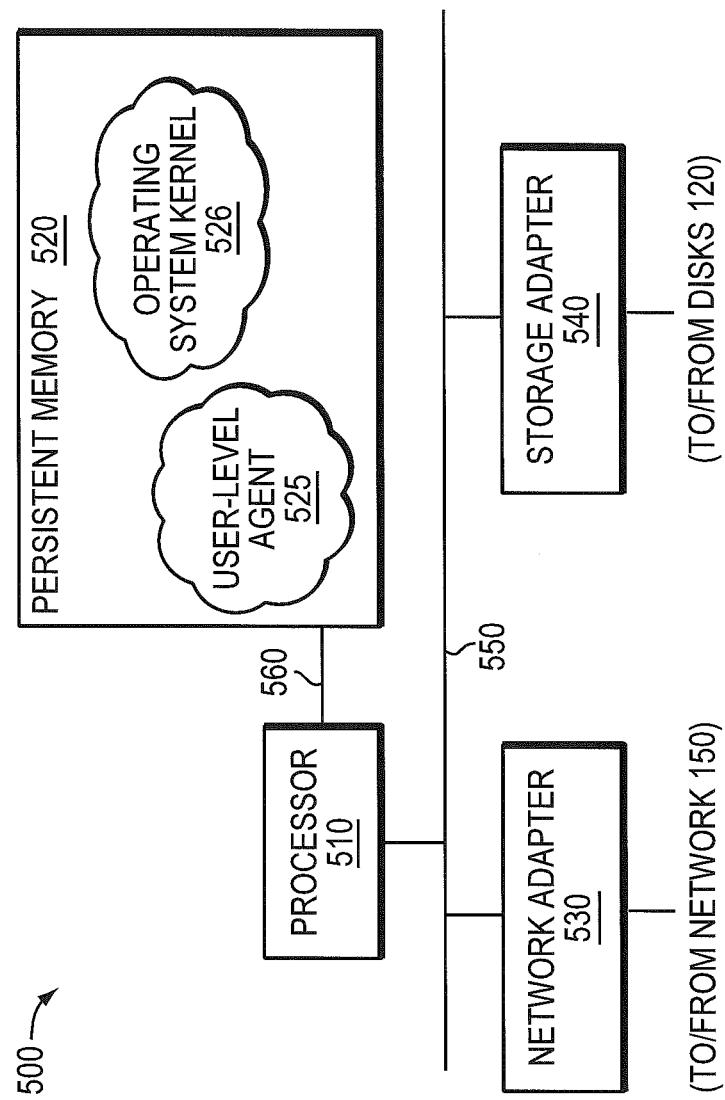
FIG. 5 is a block diagram of a storage server of the network environment.

FIG. 5 is a block diagram of storage server 500 that may be advantageously used with one or more embodiments described herein. As noted, the storage server 500 may be embodied as a storage system, a storage appliance (filer), or a blade running a user level process; illustratively, the storage server 500 is embodied as a computer configured to provide storage services to the host computer 200. As such, the storage server 500 may include a processor 510 connected to a persistent memory 520 over a memory bus 515, and further connected to a network adapter 530 and a storage adapter 540 over a system bus 550. The network adapter 530 may include the mechanical, electrical and signaling circuitry needed to connect the storage server 500 to the host computer 200 over computer network 150. The storage adapter 540 may include input/output (I/O) interface circuitry that couples to the disks 120 over an I/O interconnect arrangement, such as a conventional high-performance, FC serial link topology.

The persistent memory 520 may illustratively be embodied as non-volatile memory, such as storage class memory, having memory locations that are addressable by the processor 510 for storing software programs and data structures associated with the embodiments described herein. The processor 510 may, in turn, include processing elements and/or logic circuitry configured to execute the software programs, such as user-level process or agent 525, and manipulate the data structures, such as an in-core storage array. In an embodiment, the in-core storage array is a logical representation of an on-disk array described herein. An operating system kernel 526, portions of which are typically resident in persistent memory 520 and executed by the processing elements, functionally organizes the storage server by, inter alia, invoking operations in support of the user-level agent 525 executing on the server. It will be apparent to those skilled in the art that other processing and memory means, including various computer readable media, may be used to store and execute program instructions pertaining to the embodiments herein.

In one or more embodiments, the on-disk array 600 is embodied as an active Fibonacci array configured to efficiently accumulate the small, random data changes of a region, such as region 228, into one or more large blocks of changed data for storage on the disks 120 in a manner that realizes the streaming bandwidth of the disk. Illustratively, the small, random data changes are rendered by application 222 (in cooperation with the user-level library 225) as transaction 224, which is executed in accordance with the STM commit operation. The library 225 then initiates replication of the data by forwarding the changed data (via the network adapter 230) to the storage server 500 as one or more splinters 300 (within frame 170) associated with the transaction 224. The changed data of the splinters 300 may be received by the network adapter 530 of the storage server and loaded into persistent memory 520 for processing by the user-level agent 525 in connection with the array 600. To that end, the user-level agent 525 contains computer executable instructions executed by the processor 510 to perform operations that manage and maintain the array 600.

Figure 6:
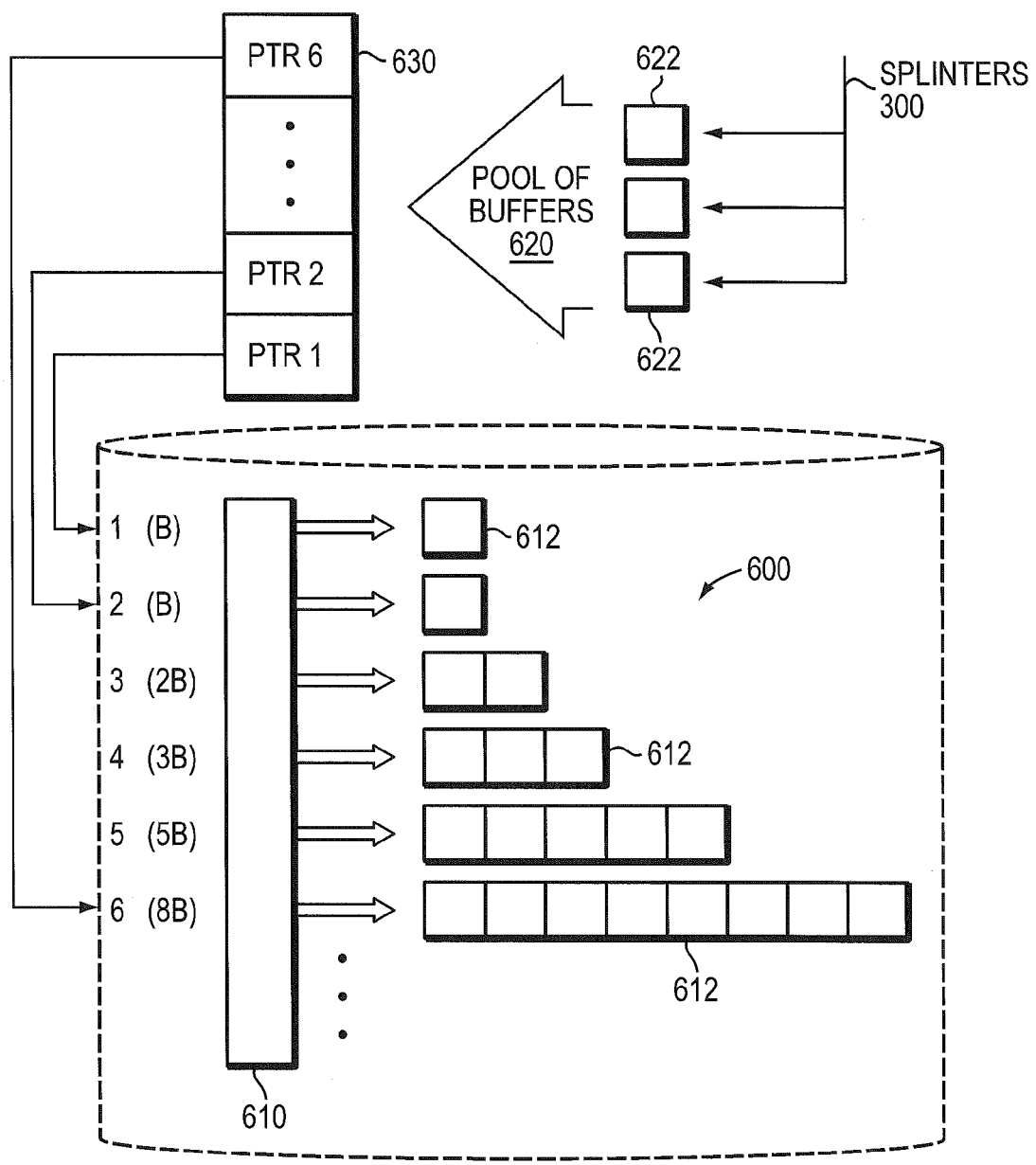
FIG. 6 is a block diagram of an on-disk array of the storage server.

FIG. 6 is a block diagram of the on-disk array 600 that may be advantageously used with the embodiments described herein. In an embodiment, an on-disk (Fibonacci) array 600 is provided for each region 228 stored on a disk 120 of the storage server 500. The array 600 is illustratively organized as a series of storage levels 610; the array is parameterized by block size B, such that a size of a level is determined by a number of block entries 612 within the level. Notably, the number of entries for each level 610 is a sum of the numbers of entries 612 of the previous two levels, e.g., a first level (and a second level) is of length B, followed by subsequent levels of lengths 2B, 3B, 5B, 8B and so on; a Fibonacci series. A logical representation of the on-disk array is maintained in the persistent memory as an in-core storage array. A portion of the in-core storage array is organized as a pool of buffers 620, with each buffer 622 also having a size B. Therefore, both the block entries 612 and the buffers 622 are parameterized by block size B which, illustratively, is a (large) block size of, e.g., 50 megabytes. The buffers 622 are maintained by the user-level agent 525 as a staging area for accumulating the small, random data changes (contained in splinters 300) prior to storage on the disk 120 as (large) block entries 612 of the array 600. The user-level agent 525 also maintains a plurality of disk pointers 630, wherein each disk pointer 630 references (points to) a level 610 of the array 600 that corresponds to a starting location of a level for storing a buffer 622 as one or more block entries 612 on disk 120.

In an embodiment, the accumulated splinters 300 within each buffer 622 are ordered internally, e.g., by a base memory address 310 of the changed data contained in the splinters. Such ordering may be facilitated through the use of relative temporal information of the splinters 300 (within frame 170). Illustratively, the relative temporal information may be embodied as the transaction identifier associated with each splinter or, in other embodiments, as a timestamp, linked list, or ordinal number. Each level 610 of the array 600 is ordered internally, e.g., by a base memory address 310 of the changed data, with the only inter-level ordering being temporal. In other words, a higher level 610 of the array connotes older block entries, e.g., the first, lowest level contains an internal ordering of newest block entries, while the last, highest level contains an internal ordering of the oldest entries. To maintain internal ordering within the levels, the user-level agent 525 illustratively implements a merge-sort technique that operates to sort (i.e., order) and periodically merge the contents of an accumulated (full) buffer 622 with the entries of ascending levels of the array to thereby discard duplicate entries (e.g., to bound the depth of the array), while also coalescing neighboring entries (e.g., to reduce the size of the array). It should be noted that periodic merging, as used herein, denotes merging in response to a triggering event, such as a full buffer 622; alternatively, the triggering event may also manifest as a predetermined time interval, so that merging may be both data-driven (i.e., as frames of splinters arrive) and/or time-driven. The periodic merging of ascending levels having larger sums of entries improves the on-disk layout of the array by enabling allocation of substantially long runs of contiguous disk blocks and realization of the streaming bandwidth capability of the disks, e.g., for both replication and restore of the region.

Figure 7:
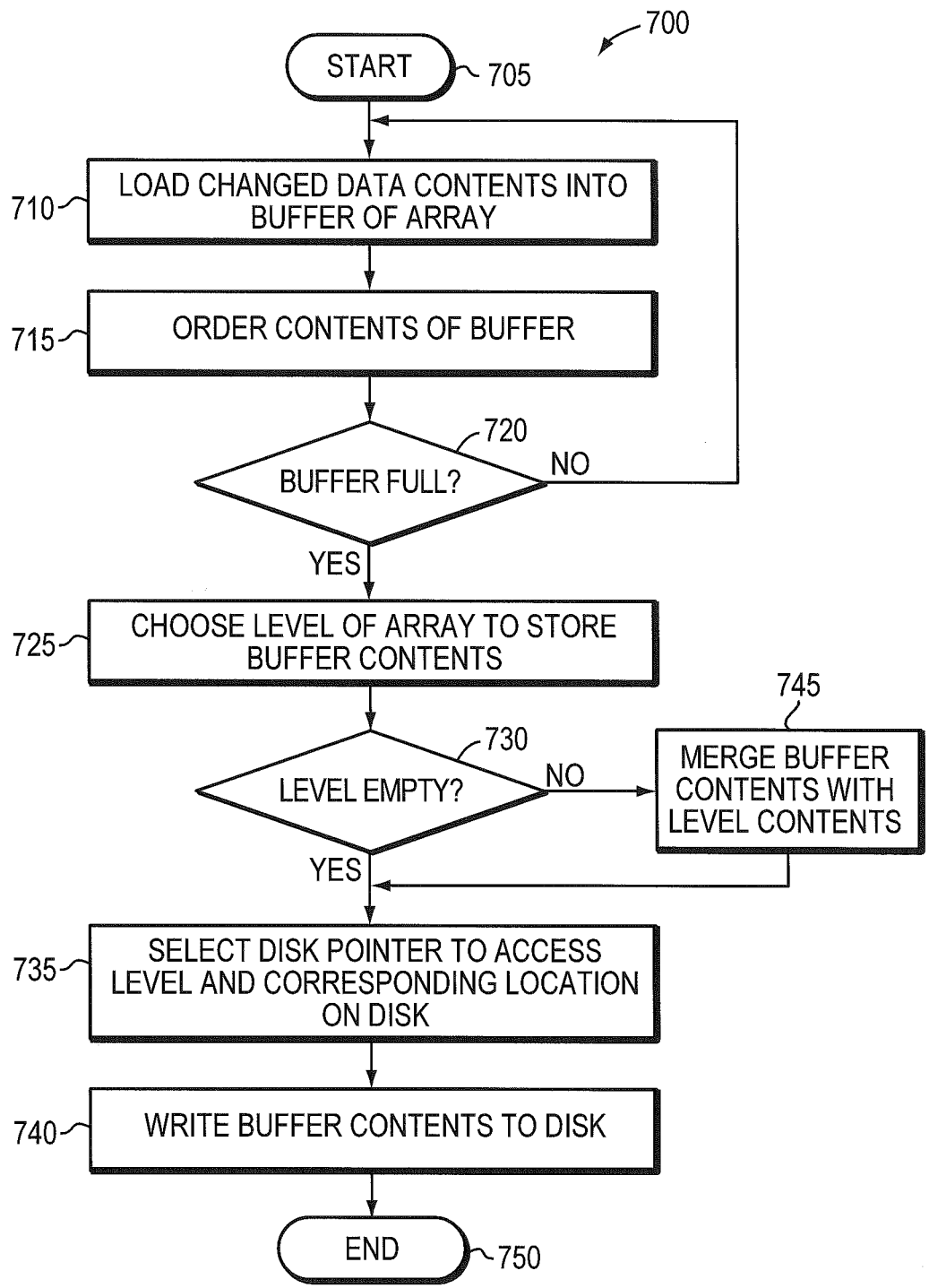
FIG. 7 is an example simplified procedure for storing small, random modifications or changes to data on one or more disks of the storage server.

FIG. 7 is an example simplified procedure for storing small, random modifications or changes to data on one or more disks of storage servers coupled to a host computer in a network environment that may be advantageously used with the embodiments described herein. The procedure 700 begins at step 705 and proceeds to step 710 where the changed data contents are loaded into a buffer of the array. In response, the user-level agent promptly acknowledges receipt of the changed data to the host computer. Illustratively, each buffer may be configured to accept changed data from a plurality of splinters although, in an embodiment, only one buffer actively accepts the changed data at a time. At step 715, the changed data contents of the buffer are ordered, e.g., by the base memory addresses of the changed data. Illustratively, the merge-sort technique may be employed to sort the changed data of the buffer (and the levels) in sequential (ascending or descending) order based on their memory addresses. At step 720, a determination is made as to whether the buffer is full. If the buffer is not full, the procedure returns to step 710. However, if the buffer is full, the user-level agent chooses a level of the array to store the buffer contents at step 725. Illustratively, the user-level agent maintains metadata indicating which levels are full and which are empty.

At step 730, a determination is made as to whether the chosen level of the array is empty. If the level is empty, the user-level agent selects a disk pointer to access the level of the array and the corresponding starting location on disk at step 735. In an embodiment, the first choice for storing the buffer contents is level 1, i.e., if level 1 is empty, the user level agent selects the disk pointer to level 1. At step 740, the contents of the buffer are then written to the starting location on disk corresponding to the level (e.g., level 1) and the procedure then ends at Step 750. It should be noted that when filled, the buffer is illustratively allocated a long, contiguous physical portion of disk so that the entire buffer contents may be written out in streaming fashion, beginning at the starting location referenced by the selected disk pointer.

However, if the chosen level of the array is not empty (i.e., is full), the contents of the buffer are merged with the block entry contents of the level in accordance with the merge-sort technique at step 745 and the procedure continues to step 735. In an embodiment, the user-level agent implements the merge-sort technique using, e.g., a 2-way merge sort algorithm that examines the base memory addresses of the changed data when merging and sorting the contents of the buffer and the block entry of a chosen level, as well as when merging and sorting from level to level. In other words, implementation of the merge-sort technique depends on whether a base memory address of the buffer contents is the same as the base address of the level contents. When duplicate or overlapping contents are encountered during the sort, the youngest (i.e., the buffer contents) are retained and the elder (i.e., on-disk level+1 contents) are discarded because they have been over-written on the host computer and are no longer valid. In addition, as neighboring (adjacent) block entries with overlapping memory address ranges are encountered, those entries are coalesced, i.e., combined, into one entry. For example, if level 1 is not empty, then the buffer is merged with level 1 to fill level 2. Here, the on-disk (block entry) contents of level 1 are retrieved from disk and loaded into the persistent memory of the storage server where those retrieved contents are merged and sorted with the contents of the buffer to fill level 2. The resulting merged and sorted contents are then written to disk at a starting location corresponding to level 2.

It should be noted that a property of the Fibonacci array is that one of the two levels is always available; another property of the array is that the levels are either fully populated or empty. Upon loading of the changed data in the buffer, the array is checked to determine whether a merge is required (e.g., based on a current state of the metadata). If two adjacent levels of the array are fully populated, they are considered unsafe. To render them safe, those levels are merged into the next level up, i.e., the next ascending level. Accordingly, adjacent levels of the array are periodically merged with one another using the merge-sort technique. The Fibonacci series arrangement of the array facilitates such merging: the size of each level is the sum of the sizes of the two previous levels. To ensure that a level is always available, the arrangement guarantees that at any given moment only two adjacent levels are populated.

Advantageously, the on-disk array (Fibonacci array) addresses the problem of efficient storage of small, random, high frequency data changes to disk by converting the small, random data changes into streaming write operations to disk, while at the same time bounding the size of the disk needed to store those changes via, e.g., periodic merging. The process of periodically merging has at least two desirable effects. First, the discovery and discarding of duplicate contents bound the size of the array (i.e., the disk), while the coalescing of neighboring entries reduces the size of the array. In a steady state of the array, each level is typically not full with the deficit (emptiness) increasing at each level. In general, the array may reach a height where its top level is sufficiently empty that it merely absorbs its two lower levels without overflowing. The second beneficial effect of periodic merging is improved on disk-layout. By merging into continuously larger levels of block entries, substantially long runs of contiguous disk blocks may be allocated to realize the full streaming bandwidth of the disk when storing (or restoring) a region.

While there have been shown and described illustrative embodiments for efficiently storing small, random modifications or changes to data on one or more storage devices, such as disks, of storage servers coupled to a host computer in a network environment, it is to be understood that various other adaptations and modifications may be made within the spirit and scope of the embodiments herein. For example, embodiments have been shown and described herein with relation to storage of changed data on an active (Fibonacci) array. However, the embodiments in their broader sense are not so limited, and may, in fact, allow for copying of the active array into a newly allocated array (having corresponding locations on disk) so as to provide a snapshot of a region, such as region 228. Here, a portion of the persistent memory 520 is allocated for the new array (i.e., the snapshot array) and the active array is copied, e.g., in accordance with a copy-on-write operation, into the snapshot array and to the corresponding locations on disk to create the snapshot. Upon creation of the snapshot, the user-level agent 525 increments a version number of the snapshot array and records the incremented version number (along with a name of the snapshot) in a directory of snapshots for the array. In addition, level-related metadata (e.g., reference counts) are managed by the user-level agent 525 to protect the levels in the snapshot array from being deleted by the active array; accordingly, the reference counts of the levels are incremented to render them read-only.

In an embodiment, a snapshot of region 228 may span across storage servers 500 of a replication group 400. The master server 160 (or any of the storage servers 500), acting as leader, may solicit transaction identifiers from the active array for the region 228 in each storage server 500, acting as peers (e.g., the leader gathers a set of transaction identifiers reported by each peer). The leader may then select the lowest transaction identifier from the set of reported transaction identifiers, such that there is an unbroken sequence from the selected identifier back to the lowest identifier reported. Each peer storage server contributes at least one transaction identifier to the sequence from the selected identifier to the lowest identifier in the set. The leader may then publish (e.g. broadcast) the selected transaction identifier as a "snap point" to the peer storage servers which, in response to receiving the snap point, create snapshots of their respective active arrays as described above. Each peer storage server may also evict from its respective snapshot array all splinters that occurred after the snap point. Upon completion, each peer storage server may respond to the leader which, in turn, acknowledges to the host computer 200 completion of the replication group snapshot. Finally, each peer storage server may merge the active array into the snapshot array.

The foregoing description has been directed to specific embodiments. It will be apparent, however, that other variations and modifications may be made to the described embodiments, with the attainment of some or all of their advantages. For instance, it is expressly contemplated that storage class memory as described herein may be selected from, among others: SONOS Flash, Nanocrystal Flash, Feroelectic RAM (FeRAM), Magnetic RAM (MRAM), Phase-Change RAM (PCRAM), Resistive RAM (RRAM), Solid Electrolyte RAM, and Polymer/Organic RAM.

It is equally contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   a storage adapter coupled to one or more disks;
   a network adapter connected to a network and configured to receive small random changes to data via the network;
   a processor connected to the storage adapter and the network adapter, the processor configured to execute an agent; and
   an on-disk array of the one or more disks, the on-disk array configured to accumulate the small, random changes to data into one or more large blocks of changed data for storage on the one or more disks to realize a streaming bandwidth of the one or more disks, wherein the on-disk array is organized as a series of levels, each level defined by one or more block entries of a predetermined size, such that a size of each level is determined by a number of block entries within the level, and wherein the number of block entries for a first level and a second level are defined according to a Fibonacci sequence.

2. The system of claim 1 wherein the number of block entries for a third level and a greater level is a sum of the numbers of block entries of a previous two levels of the array.

3. The system of claim 1 further comprising a pool of buffers organized in a persistent memory connected to the processor, each buffer having a size equal to the predetermined size, and wherein each buffer is maintained as a staging area for accumulating the small, random changes to data prior to storage on the one or more disks as the large block of changed data.

4. The system of claim 1 wherein inter-level ordering of the array is temporal such that a lowest level of the array contains newest block entries and a highest level of the array contains oldest block entries.

5. The system of claim 3 wherein each small random change to data includes a base memory address and a length, and wherein an internal ordering within each block entry of the array is by the base memory address of the accumulated small, random changes to data of the block entry.

6. The system of claim 3 further comprising a plurality of disk pointers, wherein each disk pointer references a level of the array that corresponds to a location of the block entry on the one or more disks.

7. The system of claim 5 wherein duplicate small, random changes to data are removed from a block entry of the array.

8. The system of claim 5 wherein a first block of a first level of the array is merged into a second block of a second level of the array adjacent to the first level.

9. The system of claim 8 wherein the merge includes discarding duplicate small random changes to data, and wherein the merge further includes coalescing the small random changes to data that have an overlapping memory address range.

10. A method comprising:
   receiving, at a network adapter of a storage server coupled to one or more disks, random changes to data;
   storing the random changes to data in a buffer of a storage class memory of the storage server;
   acknowledging, via the network adapter, receipt of the random changes to data; and
   accumulating, at an on-disk array, the random changes to data into one or more blocks of changed data for storage on the one or more disks to to realize a streaming bandwidth of the one or more disks, wherein the array is organized as a series of levels, each level defined by one or more block entries of a predetermined size, such that a size of each level is determined by a number of block entries within the level, and wherein the number of block entries for a first level and a second level are defined according to a Fibonacci sequence.

11. The method of claim 10, wherein the number of block entries for a third level and a greater level is a sum of the numbers of block entries of a previous two levels of the array.

12. The method of claim 10 further comprising:
   ordering contents of the buffer by a base address included in each random change to data.

13. The method of claim 12 further comprising:
   removing duplicate random changes to data from a lowest block entry of the array.

14. The method of claim 12 further comprising:
   determining a level of the array to store the contents of the buffer.

15. The method of claim 14 further comprising:
   merging a first block of the determined level of the array into a second block of an adjacent level of the array, wherein the adjacent level contains older block entries than the determined level.

16. The method of claim 14 further comprising:
   storing the contents of the buffer to the one or more disks when the determined level is empty.

17. The method of claim 15 further comprising:
   discarding duplicate random changes to data; and
   coalescing the random changes to data that have overlapping memory address ranges.

18. The method of claim 15 wherein merging of a first block of a first level of the array is triggered by one of receipt of the random changes and a timed interval.

19. A non-transitory computer readable medium encoded with software comprising computer executable instructions and when the software is executed operable to:
   receive, at a network adapter of a storage server coupled to one or more disks, random changes to data;
   store the random changes to data in a buffer of a storage class memory of the storage server;
   acknowledge, via the network adapter, receipt of the random changes to data; and
   accumulate, at an on-disk array, the random changes to data into one or more blocks of changed data for storage on the one or more disks to realize a streaming bandwidth of the one or more disks, wherein the array is organized as a series of levels, each level defined by one or more block entries of a predetermined size, such that a size of each level is determined by a number of block entries within the level, and wherein the number of block entries for a first level and a second level are defined according to a Fibonacci sequence.

20. The non-transitory computer readable medium with encoded software of claim 19, wherein the number of block entries for a third level and a greater level is a sum of the numbers of block entries of a previous two levels of the array.

* * * * *

UNITED STATES PATENT AND TRADEMARK OFFICE
CERTIFICATE OF CORRECTION

| | | |
|---|---|---|
| PATENT NO. | : 9,213,501 B2 | Page 1 of 1 |
| APPLICATION NO. | : 13/901236 | |
| DATED | : December 15, 2015 | |
| INVENTOR(S) | : Douglas Joseph Santry | |

It is certified that error appears in the above-identified patent and that said Letters Patent is hereby corrected as shown below:

In the Claims:

Col. 11, Claim 10, line 19 should read:
on the one or more disks to realize a streaming band- Signed and Sealed this
Nineteenth Day of April, 2016

Michelle K. Lee
*Director of the United States Patent and Trademark Office*